Nov. 30, 1948.  N. R. GUNDERSON  2,454,871
NONLINEAR ELECTROOPTICAL SYSTEM
Filed Oct. 9, 1946  2 Sheets-Sheet 1

Norman R. Gunderson,
INVENTOR.

BY
ATTORNEY.

Nov. 30, 1948.　　　　　N. R. GUNDERSON　　　　　2,454,871
NONLINEAR ELECTROOPTICAL SYSTEM

Filed Oct. 9, 1946　　　　　　　　　　　　　2 Sheets-Sheet 2

NORMAN R. GUNDERSON,
INVENTOR.

BY

Patented Nov. 30, 1948

2,454,871

UNITED STATES PATENT OFFICE 2,454,871

NONLINEAR ELECTROOPTICAL SYSTEM

Norman R. Gunderson, Pasadena, Calif.

Application October 9, 1946, Serial No. 702,172

17 Claims. (Cl. 250—41.5)

This invention relates generally to nonlinear electro-optical systems adapted to convert electrical or optical input into optical or electrical output which is nonlinearly related to said input. More specifically, this invention relates to an electro-optical system adapted to convert light input into an electric output virtually logarithmically related to said modulated light input; and to a system adapted to convert electric input into either a modulated light output or an electric output virtually antilogarithmically related to said electric input; and to systems adapted to translate differential input into output nonlinearly related thereto, or to translate input into differential output nonlinearly related thereto.

This invention is a continuation-in-part of my copending application, Serial No. 426,220, filed January 9, 1942, subsequently issued on January 7, 1947 as Patent No. 2,413,706. Said parent application relates to an apparatus for the production of pictorial representations and employs as an element therein, a logarithmic amplifier which is identical with the first embodiment of the logarithmic amplifier or electro-optical system disclosed herein. Electro-optical systems of the type disclosed in the remaining embodiments of my invention, described and illustrated herein, are also used in my copending application, Serial No. 702,173, filed October 9, 1946. Such nonlinear electro-optical systems have multitudinous uses. For example, in a mathematical computing apparatus and the like, an electro-optical system adapted to convert from a linear quantity to a logarithmic quantity and an electro-optical system adapted to convert a logarithmic quantity to a linear quantity is exceedingly desirable since many mathematical operations can more easily be performed by such a device. Many other uses will be apparent to those skilled in the art.

Generally speaking, this invention contemplates the use of a light receptor means including at least one phototube and inverse feed back means responsive to variations of the net electric output from the light receptor means and resulting from system input variations, for causing the modification of the net electric output of said light receptor means so that system output is nonlinearly related to system input.

The preferred forms of this invention employ an electron multiplier phototube which in the examples illustrated and described herein are of the electro-statically focused type, such as, for example, the RCA 931 electron multiplier phototube. In the system wherein modulated light input is translated into electric output, nonlinearly related to the light input, such tubes are provided with a photocathode, an anode and a multiplicity of electrostatic focusing and secondary emission electrodes, commonly known as dynodes. Generally speaking, said dynodes are provided with progressively higher electric potentials by means of a voltage divider or tapped resistor connected across said dynodes.

The modulated light input is directed to the photocathode of the electron multiplier phototube. The output from the anode causes an inverse electric feed back to the voltage divider or tapped resistor across the dynodes of the electron multiplier phototube. This alters the electron stream focusing in the phototube and, therefore, alters the amplification of the phototube. This alteration of the amplification of the phototube takes place in an inverse feed back manner and the alteration of the voltage across said voltage divider or tapped resistor is virtually a logarithmic function of the modulated light input to the photocathode of said phototube.

In the forms of this invention wherein electric input is converted into either electric output or modulated light output nonlinearly related to said input, the electric input is applied directly across the voltage divider or tapped resistor connected across the dynodes of the phototube; thus, the amplification of the phototube is varied by the input signal. The output of the phototube energizes a light valve; thus, causing light variations which are directed to the photocathode of the phototube. This acts in an inverse feed back manner also. Thus, the light output from the light valve is virtually antilogarithmically related to the electric input to the system. Instead of utilizing the light output from the light valve an electric output may be taken from the signal going to the light valve if so desired. Any type of light valve adapted to control the light exciting the phototube in response to the electric input to the light valve may be used, such as, for example, a mercury vapor rectifier tube or a fixed source of light may be used, the light from which is modulated by controllable (movable) means positioned between the source of light and the photocathode of the phototube.

The differential input or differential output forms of the system are fundamentally the same as those generally described above; the net values being used in the operation of the system.

With the above points in mind, it is an object of this invention to provide a nonlinear electro-optical system adapted to produce an electric output signal which is a virtually logarithmic function of a modulated light input signal.

It is a further object of this invention to provide a nonlinear electro-optical system adapted to produce an output which may be electrical or light which is a virtually antilogarithmic function of the electric input to the system.

It is a further object of this invention to provide a nonlinear electro-optical system adapted to produce an electric output virtually logarithmically related to a differential light input to the system.

Other and allied objects will become apparent to those skilled in the art upon a careful perusal upon the specification, appended claims, and illustrations of which:

(Fig. 2 is identical with Fig. 3 of the parent application, Serial 426,220, filed January 9, 1942.)

More specifically, a light valve or light modulating means, not shown, is employed for modulating light from a light source not shown. Any other types of light valves well known in the art may be used. For example, a mercury vapor rectifier tube with or without a heated filament may be employed as a light valve directly responsive to the current therethrough. Various other arrangements may be employed also and need not be here described.

Figure 1:
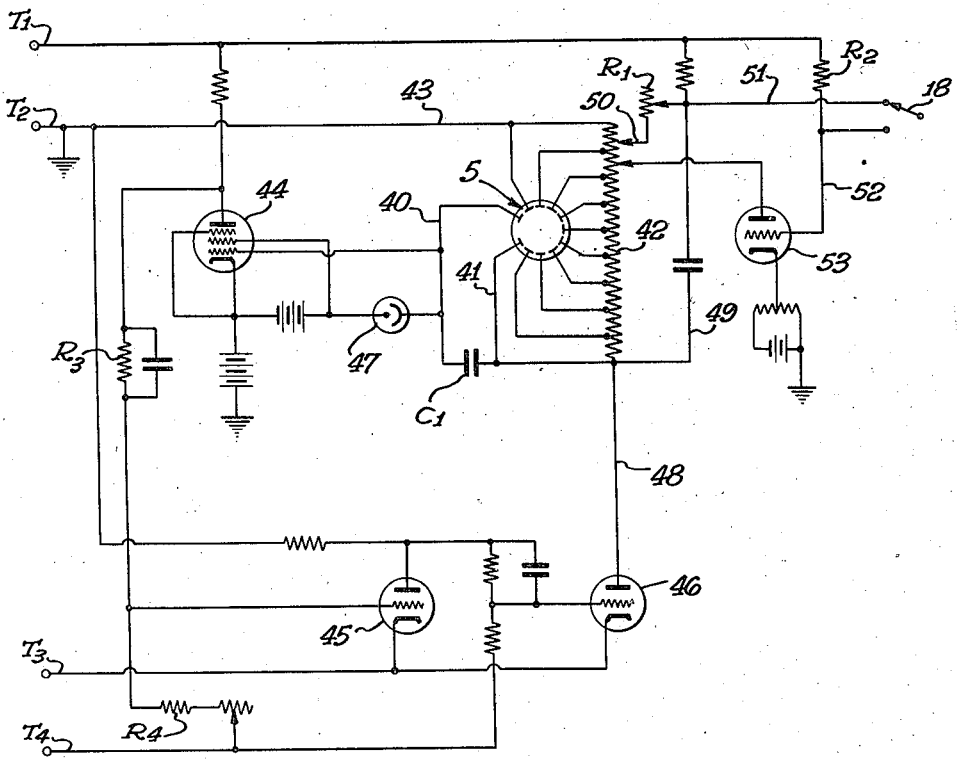
Fig. 1 is an electrical schematic drawing of a nonlinear electro-optical system, or logarithmic amplifier adapted to convert a modulated light input into an electrical output virtually logarithmically related to said input. (Said Fig. 1 is identical with Fig. 2 of beforementioned parent application, Serial No. 426,220, filed January 9, 1942.)

A wiring diagram of the logarithmic amplifier is indicated in Fig. 1, wherein a multielectrode scanning cell is indicated at 5, the light source and means for modulating same not being shown in this diagram. The anode of the tube is connected to lead line 40 and the cathode is connected to lead line 41. The other electrodes, commonly called dynodes, are connected by suitable lead lines to a tapped resistance 42. Power input terminals are indicated at $T_1$, $T_2$, $T_3$ and $T_4$. $T_2$ is grounded and is connected to the last dynode of the multielectrode cell 5 as by line 43. A resistance coupled type of amplifier is shown embodied in this circuit, such amplifier including the vacuum tubes 44, 45 and 46. In the form of device shown, the amplifier tubes are resistance coupled in series, the first being a pentode and the latter two triodes. The cathodes of amplifier tubes 45 and 46 may be connected to $T_3$. A control photoelectric cell is indicated at 47, this cell receiving a portion of the light from a source not shown before said light is modulated. The anode of the cell 5 is maintained at a positive potential by means of batteries and the current is modified by the control cell 47 under the influence of any variations in the intensity of the light source which may occur. The control grid of tube 44 is connected to the anode of cell 5 and the cathode of the control cell 47.

The plate circuit of the tube 44 is resistance coupled to the amplifier tubes 45 and 46 as previously stated. The plate output of the last amplifier tube series is connected as by line 48 to the cathode 41 of the scanning cell and to the tapped resistance 42. It may also be connected as by line 49 through a counterbalancing condenser to the output terminal 18. The output voltage from the system is removed by an adjustable tap 50 which may be connected to the tapped resistance 42 at any suitable point, depending upon the working range of potential which is desired for use in the subsequent elements of the system. An adjusting variable resistance $R_1$ may be used for balancing purposes.

In a specific embodiment of the logarithmic amplifier herein described, $T_1$ was at +250 volts, $T_3$ at —1800 volts and $T_4$ at —2000 volts. Under these conditions, if the anode current of the cell 5 is greater than that of the control cell 47, the grid of the amplifier tube 44 will be made more negative than its final equilibrium value. This will in turn cause the plate of the final amplifier tube 46 to become more positive. The voltage across cell 5 is decreased and its amplification constant is decreased, thereby decreasing the anode current of the cell 5. In the event the inherent capacity of the cell 5 is low, oscillation might take place with oscillations of large amplitude and comparatively low frequency. Such oscillations may be prevented by the use of a condenser $C_1$ adapted to apply a current to the anode 40 of the cell 5 and the cathode of cell 47, the magnitude of which is proportional to the rate of change of voltage across the cell 5. Such condenser would not be necessary in the event the cell 5 has a sufficiently high inherent capacity.

It is to be noted that means have been provided which are responsive to the variations of current output of the anode 40 for adjusting the voltage across the dynodes of the cell 5 so as to maintain the current output of the cell 5 substantially equal to that of the control cell 47, such means including the control cell 47 and the vacuum tube amplifier associated therewith. In this manner, the output voltage across the dynodes is a virtually logarithmic function of the light received. It is also to be noted that the output terminal 18 may be connected either to line 51 or to line 52. When the terminal 18 is connected to line 51, the change in potential at the terminal 18 is of the same sign as the change in potential of the cathode 41. If the terminal 18 is connected to line 52 and thus to the tube 53, then the change of potential at the terminal 18 is of opposite sign to the change in potential in the cathode 41. It is to be noted that the input to tube 53 is applied to the plate and the output is taken from the grid, the grid drawing a current determined by the resistance $R_2$. By selectively connecting terminal 18 either to line 51 or line 52 the system may be rendered operative to produce an output of either polarity.

Figure 2:
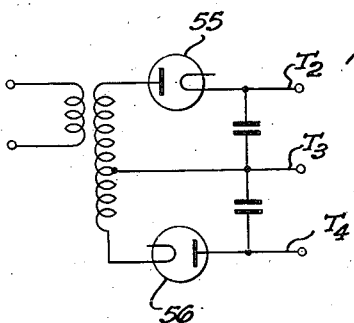
Fig. 2 is an electrical schematic drawing of one form of power supply adapted for use with the logarithmic amplifier of Fig. 1.

In order to render the grid to filament voltage to tube 45 nearly independent of the power supply voltage, the voltage change across the resistance $R_3$ due to fluctuations in line voltage, is made proportional to the changes across the resistance $R_4$ due to fluctuations in line voltage. This is accomplished by causing the voltage between the terminals $T_2$ and $T_3$ to the proportional to the voltage between $T_3$ and $T_4$. A power supply adapted to attain this result is indicated in Fig. 2, the output terminals of the power supply being indicated at $T_2$, $T_3$ and $T_4$. This power supply includes two half wave rectifiers 55 and 56 attached to each terminal of the secondary, such secondary being tapped as indicated, thereby permitting the output voltages to be maintained proportional with variations in voltage across the primary. The voltage between $T_3$ and $T_4$ is therefore a predetermined proportion of the voltage between $T_2$ and $T_3$.

As indicated in the parent application, a plurality of color separation photographic images may be scanned, the modulated light received by the scanning of each photographic image being received by a phototube such as 5 of Fig. 1. The output of 18 of Fig. 1 is then a color signal. Three such color signals may then be similarly modified (as stated in beforesaid copending parent application) and a black signal obtained, thereby producing two instantaneously effective color output signals and a black output signal which may be corrected so as to compensate for overlapping color absorption characteristics of the inks to be used in reproduction (as stated in said parent application) and then supplied to a reproducing head. A facsimile or colored reproduction may thus be obtained. The system, in combination with an antilogarithmic amplifier of the type shown in Fig. 5 herein, may also be used in producing corrected color separation negatives (or positives), which may be used for making color printing plates. The logarithmic amplifiers shown in Figs. 1, 3, 4 and the antilogarithmic amplifier shown in Fig. 5 herein, may be used (as indicated in copending application, Serial No. 702,173, which is also a continuation-in-part of said parent application) in color reproduction systems similar to those just described.

The apparatus of the present invention is well adapted for use in various mathematical computing apparatuses. For example, recent developments in continuous hydrocarbon analysis in refineries and the like, using the latest mass spectrometers or infra-red spectrophotometers make it highly desirable to be able to calculate as many as twelve linear simultaneous equations as rapidly as possible since any process correction should be made as soon as possible after sampling. Present methods using ordinary calculators may take as long as four or five hours for solving such a system of twelve simultaneous linear equations. One of the most important steps in such solution is rapid and accurate means for similarly multiplying or dividing the variables. Such a means is provided in the logarithmic and antilogarithmic amplifiers of this invention which should expedite the solution of such problems.

Another example where my invention may be used advantageously is in rapid involution and evolution since all that is necessary to take a root or power of a quantity is to take the logarithm thereof and multiply or divide or both. Very complicated roots and powers may thus be taken with great rapidity.

The apparatus of the present invention is well adapted for use in instruments, recorders, controllers, regulators, servomechanisms and the like, in fact anywhere where variables are to be controlled, measured or the like, in nonlinear relation.

Many other applications of my invention will be apparent to those skilled in the art.

Figure 3:
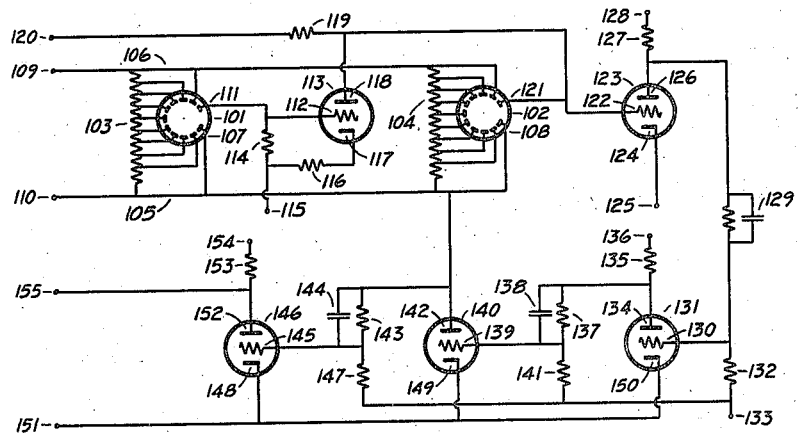
Fig. 3 is an electrical schematic drawing of a nonlinear electro-optical system or differential logarithmic amplifier adapted to convert the difference between modulated light input received by two phototubes into electric output virtually logarithmically related to the difference between said modulated light inputs.

Referring to the second form of my invention, shown in Fig. 3, which comprises a differential electro-optical system or logarithmic amplifier, the dynodes of two electron multiplier phototubes 101 and 102, are connected to tapped corresponding voltage divider or tapped resistors 103 and 104 which are connected in parallel between leads 105 and 106, the cathodes 107 and 108 of the phototubes 101 and 102 being connected in parallel to the lead 105; and the dynodes of the phototubes 101 and 102 being connected in parallel to the lead 106. The lead 106 is connected to positive power input terminal 109. The lead 105 is connected to system output terminal 110.

The anode 111 of the phototube 101 is connected to the grid 112 of a phase inverter tube 113. The grid 112 is also connected through a resistor 114 to power input terminal 115. The power input terminal 115 is also connected through a resistor 116 to the cathode 117 of the phase inverter tube 113. The anode 118 of the phase inverter tube 113 is connected through a plate resistor 119 to positive power input terminal 120.

The anode 121 of the phototube 102 is connected to the grid 122 of an electron tube 123 and is also connected and in parallel to the anode 118 of the phase inverter tube 113, to the resistor 119 and to the positive power input terminal 120. Thus, the output of the phase inverter tube 113 (which is 180° removed in phase from the output of the phototube 101) and the output current from the phototube 102, both pass through the plate resistor 119 to the positive power input terminal 120 and said combined total current controls the grid bias of the electron tube 123.

The cathode 124 of the electron tube 123 is connected to negative power input terminal 125. The anode 126 of the electron tube 123 is connected through plate resistor 127 to positive power input terminal 128. The anode 126 of the electron tube 123 is also connected to a parallel resistance capicitance circuit indicated at 129, the opposite end of which is connected to the grid 130 of an amplifier tube 131. The grid 130 is also connected through a resistor 132 to negative power input terminal 133.

The anode 134 of the electron tube 131 is connected through a plate resistor 135 to positive power input terminal 136. The anode 134 is also connected through a resistor 137 shunted by a condenser 138 to the grid 139 of an amplifier tube 140. The grid 139 is also connected through a resistor 141 to the negative power input terminal 133.

The anode 142 of the amplifier tube 140 is connected to the lead 105 which is connected to the lower ends of the voltage divider 103 and 104 across the phototube 101 and 102 and which is also connected to the photocathodes 107 and 108 thereof. The anode 142 of the amplifier tube 140 is also connected through a resistor 143 shunted by condenser 144 to the grid 145 of a phase inverter tube 146. The grid 145 is also connected through a resistor 147 to negative power input terminal 133. The cathodes 148, 149 and 150, respectively, of the three electron tubes 146, 140 and 131 are connected in parallel to the negative power input terminal 151.

The anode 152 of the phase inverter tube 146 is connected through a plate resistor 153 to positive power input terminal 154. The anode 152 is also connected to a system output terminal 155.

The operation of the system may be described as follows:

The modulated light input to the phototube 101 causes the phase inverter tube 113 to have an output current which is 180° removed in phase from the modulated light input to the phototube 101. The modulated light input to the phototube 102 has an output current which is a direct function of the modulated light input to said phototube. The electric output of the phase inverter tube 113 and the electric output of the phototube 102 both flow through the plate resistor 119 to positive power input terminal 120. Thus, the grid bias of the tube 123 is controlled by the difference between the two modulated light inputs to the two phototubes 102 and 101. In this way an increase of light on the photo cell 101 causes a decrease in the current through the resistor 119, while an increase in light on the photo cell 102 causes an increase in the current through resistor 119. The voltage drop across the resistor 119 regulates the grid bias of the tube 123. The output of the tube 123 is amplified by the tubes 131 and 140.

The potential of the anode 142 of the amplifier tube 140 determines the potential of the lead 105 connected to the lower ends of the voltage dividers or tapped resistors 103 and 104 connected across the dynodes of the phototubes 101 and 102, and the potential of the photocathodes 107 and 108 of the phototubes 101 and 102. Since the positive potential of positive power input terminal 109, which is connected across the upper ends of the tapped resistors or voltage dividers 103 and 104 and the dynodes of the phototubes 101 and 102, is maintained at constant potential, while the potential at the opposite ends thereof, determined by the anode 142 of the amplifier tube 140, varies, the total voltage drop across the dynodes varies accordingly; and thus, regulates the amplification constant of the phototubes.

As an example of system operation, if we assume that the light input to phototube 101 is small relative to the light input to the phototube 102, the current from the photo cell 101 will always be small in comparison to the current from photo cell 102 and so will contribute only a minor effect. As the current through resistor 119 is greater than its final equilibrium value, the grid 122 of the electron tube 123 will be made more negative than its final equilibrium value. The anode 126 of the electron tube 123 and the grid 130 of the electron tube 131 will be made more positive, and the anode 134 of the electron tube 131, and the grid 139 of the electron tube 140 will be made more negative. The anode 142 of the electron tube 140 will be made more positive, thus reducing the voltage across the dynodes of the photo cells 101 and 102. This, in turn, reduces the amplification constant of the photo cells and reduces the combined current through the resistor 119. This action continues until a state of equilibrium is reached. The voltage range of the grid 122 of the electron tube 123 required in order to get the required range in the potential of the anode 142 of the electron tube 140, is so small that the voltage drop across the resistor 119 and the current through the resistor 119 may be considered to be virtually constant.

Tube 146 is a phase inverter tube. The output terminal of the entire logarithmic amplifier or electro-optical system may be taken to be the terminal 110 or the terminal 155. The terminal 110 becomes more positive with an increase of light on the photo cell 102 and the terminal 155 becomes more negative with an increase of light on the photo cell 102. Thus, by proper choice of output terminals, an output signal of the desired polarity may be obtained. Said output signals at the output terminals are virtually logarithmic functions of the differential light input to the two phototubes 101 and 102.

Figure 4:
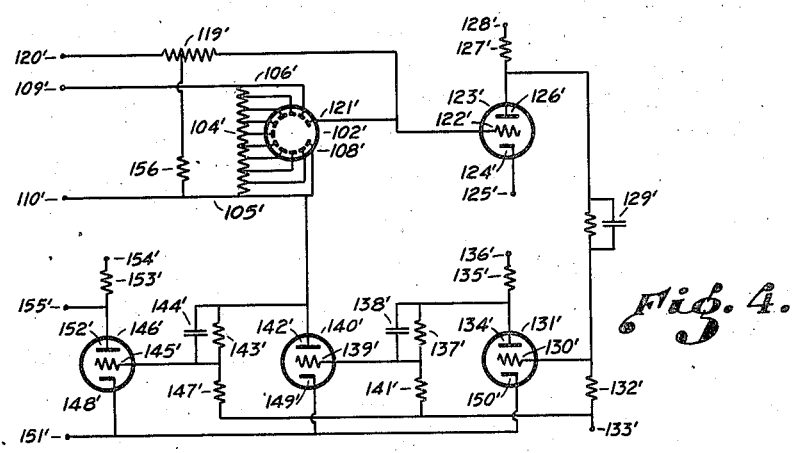
Fig. 4 is an electrical schematic drawing of a corrected nonlinear electro-optical system or logarithmic amplifier adapted to convert modulated light input into electric output virtually logarithmically related to said modulated light input.

Referring to Fig. 4, a third embodiment of this invention is disclosed therein. This version of the invention is adapted to virtually compensate for the fact that at high values of current amplification in the electron multiplier phototube, the anode current is slightly too low to give the desired logarithmic effect. In other words, for high potentials across the dynodes of said electron multiplier phototube, the output current of the phototube departs from its logarithmic functional relation to the potential across the dynodes. This effect is virtually non-existant or so negligible as to be unimportant at ordinary amplification values. However, if the light input to the system falls to such a low value that the inverse feed back modification of the potential across the dynodes is such as to increase the potential across said dynodes to a relatively high value, the desired logarithmic functional relationship between input and output may not be obtained. This may be compensated for by the system shown in Fig. 4.

Referring to said Fig. 4, a light valve or light modulating means, not shown, is adapted to modulate light from a light source not shown in response to input electric signal and to direct said light upon the electron multiplier phototube 102'. The photocathode 108' of the phototube is connected to a lead 105'. A lead 106' is connected to the first dynode of the phototube 102'. Connected between the leads 105' and 106' is a tapped resistor or voltage divider 104' which is, in turn, connected to the dynodes of the phototube. The lead 106' is connected to positive power input terminal 109'.

The anode 121' is connected to the grid 122' of an electron tube 123'. The anode 121' is also connected through a tapped plate resistor 119' to positive power input terminal 120'. Lead 105' is connected to a system output terminal 110'. The cathode 124' of the electron tube 123' is connected to negative power input terminal 125'.

The anode 126' of the electron tube 123' is connected through a plate resistor 127' to positive power input terminal 128'. The anode 126' is also connected to a parallel resistance capacitance circuit indicated generally at 129', the opposite end of which is connected to the grid 130' of an amplifier tube 131'. The grid 130' is also connected through a resistor 132' to negative power input terminal 133'.

The anode 134' of the amplifier tube 131' is connected through a plate resistor 135' to positive power input terminal 136'. The anode 134' is also connected through a resistor 137' shunted by a condenser 138' to the grid 139' of an amplifier tube 140'. The grid 139' is also connected through a resistor 141' to a negative power input terminal 133'.

The anode 142' of the amplifier tube 140' is connected to the lead 105', and is also connected through a resistor 156 to the top of tapped resistor 119' and through a portion of the tapped resistor 119' to positive power input terminal 120'. The anode 142' is also connected through a resistor 143' shunted by a condenser 144' to the grid 145' of the phase inverter tube 146'. The cathodes 148', 149' and 150', respectively, of the three tubes 146', 140' and 131' are connected in parallel to negative power input terminal 151'.

The anode 152' of the phase inverter tube 146' is connected through a plate resistor 153' to positive power input terminal 154'. The anode 152' is also connected to system output terminal 155'.

The operation of this system is quite similar to the operation of the system shown in Fig. 3, except that there is only one modulated light input to the system shown in Fig. 4, whereas two modulated light inputs were utilized in the system shown in Fig. 3, and whereas in system shown in Fig. 4 correction is made so as to maintain a logarithmic relationship at extremely high values of phototube amplification constant. The modulated light input to the photocathode 108' of the phototube 102' varies the anode current flowing through the tapped resistor 119'. This varies the grid bias of the tube 123'. The output from the electron tube 123' in turn is amplified in the tubes 131' and 140' which varies the potential across the voltage divider 104' and thus, the amplification constant of the phototube 102' in an inverse feed back manner.

The resistor 156 connected between the anode 142' of the tube 140' and the tapped resistor 119' has the effect of decreasing the anode current which is required for equilibrium in the system, this being equivalent to an increase in amplification of the phototube. This amplification effect increases with voltage across the dynodes and is nonlinear with respect to the voltage across the dynodes. Thus, by choosing the proper values for the resistances of the system it is possible to compensate for the dropping off of photo cell amplification in relation to the desired logarithmic relation for high values of voltage across the dynodes.

As an example of the operation of the system, as the current from the photo cell 102' passing through the tapped resistor 119' is greater than its final equilibrium value, the grid 122' of the tube 123' will be made more negative than its final equilibrium value. The anode 126' of the tube 123' and the grid 130' of the electron tube 131' will be made more positive, and the anode 134' of the electron tube 131' and the grid 139' of the electron tube 140' will be made more negative. The anode 142' of the electron tube 140' will be made more positive; thus reducing the voltage across the dynodes of the photocell 102'. This in turn reduces the amplification of the photo cell and reduces the current through the resistor 119'. This action continues until a state of equilibrium is reached. The required voltage range of the grid 122' of the tube 123' necessary in order to get the required range in the potential of the anode 142' of the electron tube 140', is so small that the voltage drop across the tapped resistor 119' and the current therethrough may be considered to be virtually constant.

Figure 5:
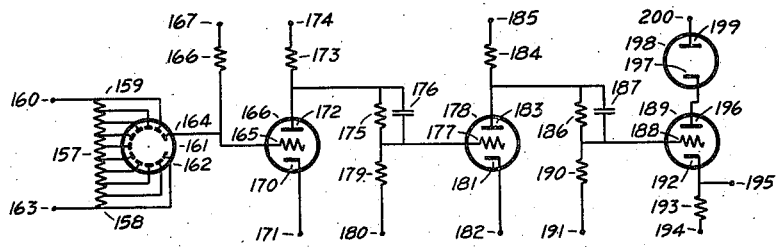
Fig. 5 is a nonlinear electro-optical system adapted to convert an electric input signal into either a modulated light output or an electric output signal virtually antilogarithmically related to said electric input signal.

A nonlinear electro-optical system which may act as a nonlinear light valve or a nonlinear amplifier (in other words, may have modulated light output or electric output) is illustrated in Fig. 5. A tapped resistor voltage divider 157 is connected between two leads 158 and 159. The lead 159 at one end is connected to positive power input terminal 160. The lead 159 at the other end is connected to the first dynode of an electron multiplier phototube 161. The balance of the dynodes of the electron multiplier phototube 161 are connected at spaced points along the voltage dividers or tapped resistors 157. The lead 158 is connected to the photocathode 162 of the phototube 161. The lead 158 is also connected to electric signal input terminal 163. The anode 164 of the phototube 161 is connected to the grid 165 of an amplifier tube 166. The anode 164 of the phototube 161 is also connected through a plate resistor 166 to a positive power input terminal 167. The cathode 170 of the amplifier tube 166 is connected to negative power input terminal 171.

The anode 172 of the amplifier tube 166 is connected through a plate resistor 173 to positive power input terminal 174. The anode 172 is also connected through a resistor 175 shunted by a condenser 176 to the grid 177 of a second amplifier tube 178. The grid 177 is also connected through a resistor 179 to negative power input terminal 180. The cathode 181 of the second amplifier tube 178 is connected to negative power input terminal 182.

The anode 183 of the second amplifier tube 178 is connected through a plate resistor 184 to positive power input terminal 185. The anode 183 is also connected through a resistor 186 shunted by a condenser 187 to the grid 188 of a power amplifying tube 189. The grid 188 is also connected through a resistor 190 to negative power input terminal 191. The cathode 192 of the power amplifier tube 189 is connected through a cathode resistor 193 to negative power input terminal 194. The cathode 192 is also connected to system electric output terminal 195.

The anode 196 of the power amplifier tube 189 is connected in series with the cathode 197 of a mercury vapor rectifier tube 198. The anode 199 of the mercury vapor rectifier tube 198 is connected to positive power input terminal 200.

The system operates as follows: the mercury vapor rectifier tube 198 has its current controlled by the power amplifier tube 189, the grid bias of which is controlled by the phototube 161 through the two amplifying tubes 166 and 178. In operation the system adjusts itself to a state of equilibrium. If the mercury vapor rectifier tube 198 emits less light than this equilibrium value, the photo cell 161 delivers too little anode current through the resistor 166. This makes the grid 165 of the first amplifier tube 166 more positive and the current through the first amplifier tube 166 increases. This makes the anode 172 of the first amplifier tube 166 more negative and also makes the grid 177 of the second amplifier tube 178 more negative. This decreases the current flow through the second amplifier tube 178 and makes the anode 183 of the second amplifier tube 178 and the control grid 188 of power amplifier tube 189 more positive. This causes more current to flow through the power amplifying tube 189 and the mercury vapor rectifying tube 198, thus causing the amount of light emitted by the mercury vapor rectifier tube to increase. This action continues until the equilibrium point is reached.

When the input signal voltage applied to input terminal 163 is changed the sensitivity of the photo cell 161 or the amplification thereof is changed, and the equilibrium of the system is disturbed. The entire system then adjusts itself to a new point of equilibrium. The relationship of the modulated light emitted by the mercury vapor rectifier tube 198 with respect to the input signal applied to the input terminal 163 is virtually antilogarithmic.

If it is desired to have an electric output signal rather than a light output, electric output terminal 195 may be utilized. It can readily be seen that the voltage output at said terminal 195 is linearly related to the light emitted by the mercury vapor rectifier tube 198.

It should be understood that the amplifier tubes 166 and 177 positioned between the phototube 101 and the power amplifier tube 189 are not essential in this device and may be dispensed with entirely if so desired. The purpose served by said two intermediate amplifier tubes shown in Fig. 5, is to reduce time lag due to the effect of capacity at the grid of the power amplifier tube and it also provides means for making the output current of the photo tube more nearly constant by reducing the voltage range of the output terminal of the photo tube. In place of said two amplifier tubes a cathode follower tube might be positioned between the photo tube and the power amplifier tube 189 if so desired. This would also have the effect of reducing time lag due to capacity effect, etc. However, as before said, said intermediate stages may be dispensed with entirely if so desired.

It should be noted that all the embodiments shown in this application are based upon the use of a multielectrode, electrostatically focused, electron multiplier phototube similar to the RCA multiplier phototube 931. The phototubes used in the embodiments of this invention, described and illustrated, are 9-stage electrostatically focused, electron multiplier phototubes having nine dynodes, each at a higher potential than the preceding dynode. These dynodes act as secondary emitters, thus multiplying the final anode output current of the phototube many many times over the actual electron emission of the photocathode resulting from exciting illumination.

Theoretically, in an electron multiplier tube of the type described, each successive dynode has the effect of emitting a number of secondary electrons corresponding to a certain multiple of the number of primary electrons striking said dynode. This multiple we will designate by the letter "$n$." This multiplication factor, $n$, is dependent upon the voltage between succeeding dynodes. Since there are nine such dynodes in the phototube used in the embodiments of this invention, described and illustrated herein, the amplification constant of the tube should theoretically be $n$ to the 9th power; however, in practice it is found that $n$ does not increase linearly with increasing voltage across the dynodes but increases less rapidly than the voltage across the dynodes. Therefore, the effective amplification constant is related to the voltage across the dynodes as a power function somewhat less than a 9th power curve and closely approximates logarithmic curve at low values of amplification constant. As the amplification constant increases, the curve increasingly deviates from a true logarithmic curve. However, in the operating range of the apparatus disclosed herein, virtually logarithmic relationship holds. Thus, it can be seen that I have provided relatively fool-proof, simple and efficient nonlinear electro-optical systems adapted to produce light output from electric input or electric output from light input, or light output from light input where the various outputs are nonlinearly related to the various inputs either logarithmically or anti-logarithmically and where various inputs or outputs may be differential if so desired.

It should be understood that while I have described and illustrated forms of my invention each utilizing an electron multiplier phototube having multiple successive stages of controllable amplification therein, a simple linear photo cell coupled to a multiple stage electron tube amplifier may be used if desired. The inverse feed back means connected to the amplifier output is coupled to the various stages of the electron amplifier equally in or in various ratios depending upon the curve desired for modifying the amplification of each stage of the amplifier. One such system might use alternating current and variable mu tubes in the multiple stage amplifier, the inverse feed back means being adapted to vary the mu of the tubes. In fact any multiple stage amplifier in which the amplification constants of the various stages may be controlled may be used in my invention in place of the electron multiplier phototube described and illustrated herein. If desired, the system may use no phototubes at all but may directly use electric input to the multiple stage amplifier instead of using light input to a phototube and using the phototube electric output as the electric input to the multiple stage amplifier.

This modification may also be used in the forms of my invention where the system input is applied to the amplification controlling means.

Numerous modifications of this invention are possible and within the spirit and scope of this invention. For example, the light modulating means for modulating light input to the various systems may be any type of light valve or may be a light source itself which varies according to electric input, such as for example, neon glow tubes or the like. It is to be understood that the mercury vapor rectifier tube used herein as a light valve is preferably of the type having a heated filament although not necessarily so. It is also understood that the various electronic tubes illustrated herein have suitable filaments and filament power supplies not shown for heating the cathodes of the various tubes. The various negative and positive power input terminals may be connected to suitable source of electric power not shown.

The examples described and illustrated herein are exemplary only and are not intended to limit the scope of this invention. The scope of this invention is to be limited only by the appended claims.

I claim:

1. In a nonlinear electro-optical system: an electron multiplier phototube provided with an anode, a photocathode and multiple electrostatic focusing, secondary emission electrodes; and means responsive to variations of phototube anode current resulting from phototube light input variations, for causing modification of the voltage across the multiple electrodes in an inverse feed back manner whereby the voltage across the multiple electrodes is a virtually logarithmic function of the light exciting the photocathode of the phototube.

2. In a nonlinear electro-optical system: an electron multiplier phototube provided with an anode, a photocathode and multiple electrostatic focusing, secondary emission electrodes; and means responsive to variations of phototube anode current resulting from phototube light input variations, for causing modification of the voltage across the multiple electrodes in an inverse feed back manner whereby the electric output of the system is a virtually logarithmic function of the light input to the photocathode of the phototube.

3. In a nonlinear electro-optical system: an electron multiplier phototube provided with an anode, a photocathode and electrically responsive means for controlling secondary emission within the phototube; and means responsive to variations of phototube anode current resulting from phototube light input variations, for causing modification of the electric input to the secondary emission controlling means in an inverse feed back manner, whereby said electric input to the secondary emission controlling means is a virtually logarithmic function of the light exciting the photocathode of the phototube.

4. In a nonlinear electro-optical system: an electron multiplier phototube provided with an anode, a photocathode and electrically responsive means for controlling secondary emission within the phototube; and means responsive to variations of phototube anode current resulting from phototube light input variations, for causing modification of the electric input to the secondary emission controlling means in an inverse feed back manner, whereby the electric output of the system is a virtually logarithmic function of light input to the photocathode of the phototube.

5. In a nonlinear electro-optical system: at least two electron multiplier phototubes, each provided with an anode, a photocathode and multiple electrostatic focusing, secondary emission electrodes; and means responsive to variations of differential phototube electric output resulting from differential phototube light input variations, for causing modification of the voltage across the multiple electrodes in an inverse feed back manner, whereby the voltage across the multiple electrodes is a virtually logarithmic function of differential light input exciting the photo cathodes of the phototubes.

6. In a nonlinear electro-optical system: at least two electron multiplier phototubes, each provided with an anode, a photocathode and multiple electrostatic focusing, secondary emission electrodes; and means responsive to variations of differential phototube electric output resulting from phototube light input variations, for causing modification of the voltage across the multiple electrodes in an inverse feed back manner, whereby the electric output of the system is a virtually logarithmic function of differential light input to the photocathodes of the phototubes.

7. In a nonlinear electro-optical system: at least two electron multiplier phototubes, each provided with an anode, a photocathode and electrically responsive means for controlling secondary emission within the phototubes; and means responsive to variations of differential phototube electric output resulting from phototube light input variations for causing modification of the electric input to the secondary emission controlling means in an inverse feed back manner, whereby said electric input is a virtually logarithmic function of differential light input exciting the photocathodes of the phototubes.

8. In a nonlinear electro-optical system: at least two electron multiplier phototubes, each provided with an anode, a photocathode and electrically responsive means for controlling secondary emission within the phototubes; and means responsive to variations of differential phototube electric output resulting from phototube light input variations for causing modification of the electric input to the secondary emission controlling means in an inverse feed back manner, whereby the electric output of the system is a virtually logarithmic function of differential light input to the photocathodes of the phototubes.

9. In a nonlinear electro-optical system: an electron multiplier phototube provided with an anode, a photocathode and multiple electrostatic focusing, secondary emission electrodes; light valve means responsive to variations of phototube anode current resulting from voltage variations across the multiple electrodes for causing modification of the light exciting the photocathode of the phototube in an inverse feed back manner whereby the light exciting the photocathode of the phototube is a virtually antilogarithmic function of the voltage across the multiple electrodes.

10. In a nonlinear electro-optical system: an electron multiplier phototube provided with an anode, a photocathode and multiple electrostatic focusing, secondary emission electrodes; light valve means responsive to variations of phototube anode current resulting from input signal voltage variations applied across the multiple electrodes for causing modification of the light exciting the photocathode of the phototube in an inverse feed back manner whereby the light output of the system is a virtually antilogarithmic function of the electric signal input voltage applied across the multiple electrodes.

11. In a nonlinear electro-optical system: an electron multiplier phototube provided with an anode, photocathode, and multiple electrostatic focusing, secondary emission electrodes; light valve means responsive to variations of phototube electric output for causing modification of the light exciting the photocathode of the phototube in an inverse feed back manner whereby the electric output of the system is a virtually antilogarithmic function of the electric input to the system.

12. In a nonlinear electro-optical system: an electron multiplier phototube provided with an anode, a photocathode and electrically responsive means for controlling secondary emission within the phototube; and light valve means responsive to variations of phototube anode current resulting from input signal variations applied to the secondary emission controlling means, for causing modification of the light exciting the photocathode of the phototube in an inverse feed back manner, whereby the light exciting the photocathode of the phototube is a virtually antilogarithmic function of the electric input signal applied to the secondary emission controlling means.

13. In a nonlinear electro-optical system: an electron multiplier phototube provided with an anode, a photocathode and electrically responsive means for controlling secondary emission within the phototube; and light valve means responsive to variations of phototube anode current resulting from input signal variations applied to the secondary emission controlling means for causing modification of the light exciting the photocathode of the phototube in an inverse feed back manner, whereby the output of the system is a virtually antilogarithmic function of the input to the system.

14. In a nonlinear electro-optical system: light receptor means including at least one phototube; and inverse feed back means responsive to variations in either direction of net electric output from the light receptor means resulting from system input variations for causing said net electric output from the light receptor means to return virtually to a preselected value so that system output is nonlinearly related to system input.

15. In a nonlinear system: electron tube amplifier means including a plurality of stages; and inverse feed back means responsive to amplifier output variations in either direction resulting from system input variations for altering the amplification factor of the amplifier so as to return said amplifier output virtually to a preselected value so that system output is nonlinearly related to system input.

16. In a nonlinear system: amplifier means including a plurality of stages; and inverse feed back means responsive to amplifier output variations in either direction resulting from system input variations for returning said amplifier output virtually to a preselected value so that system output is nonlinearly related to system input.

17. In a nonlinear electro-optical system: an electron multiplier phototube provided with an anode, a photocathode and electrically responsive means positioned adjacent to and acting upon the electron flow through the phototube for controlling secondary emission within the phototube; and inverse feed back means responsive to variations of phototube anode current resulting from phototube light input variations, connected to said electrically responsive means to modify the electric input to said electrically responsive means in an inverse feed back manner, whereby said electric input to said electrically responsive means is a nonlinear function of the light exciting the photocathode of the phototube.

NORMAN R. GUNDERSON.

REFERENCES CITED

The following references are of record in the file of this patent:

UNITED STATES PATENTS

| Number | Name | Date |
| --- | --- | --- |
| 2,024,139 | Armstrong | Dec. 17, 1935 |
| 2,283,241 | Van Cott | May 19, 1942 |